UNITED STATES PATENT OFFICE.

WILLARD E. CASE, OF AUBURN, NEW YORK.

PROCESS OF MAKING ALUMINUM COMPOUNDS.

SPECIFICATION forming part of Letters Patent No. 504,324, dated September 5, 1893.

Application filed April 9, 1891. Renewed February 6, 1893. Serial No. 459,496. (No specimens.)

*To all whom it may concern:*

Be it known that I, WILLARD E. CASE, of Auburn, Cayuga county, New York, have invented a new and useful Improvement in Processes for the Manufacture of Aluminum Compounds, of which the following is a specification.

The object of my invention is to produce an aluminum compound which from its constitution and physical properties is capable of many uses in the arts. While I believe this compound to be an oxy-fluoride of aluminum and sodium, I do not wish to limit myself to this view of its constitution, since the process by which it is produced is the invention which I wish to secure hereby.

I produce this aluminum compound by the following process: I dissolve aluminium sulphate in water and add thereto calcium fluoride, preferably heating the solution to a temperature of 180° Fahrenheit, in order to expedite the reaction, and preferably maintaining it at this temperature for several hours. On account of its cheapness, I prefer to use ground fluor-spar for this purpose. The reaction which takes place may probably be represented by the following formula:—

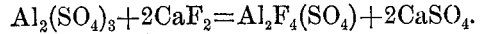

I next separate, by filtration or otherwise, the precipitated calcium sulphate, (together with such excess of calcium fluoride as remains undecomposed,) from the resulting fluo-sulphate solution. For the next step I consider it advisable, although not essential, that this solution should have a specific gravity of about 1.040. I next prepare an aqueous solution of an alkali-carbonate, such as sodium carbonate, or soda-ash, and I prefer for this purpose to use a saturated solution simply for convenience. Now, if iron is present,—and if the aluminium sulphate and calcium fluoride are of the usual commercial qualities they may either of them contain iron, as an impurity,—I proceed to remove such iron by the following operation: I add the alkali-carbonate solution to the fluo-sulphate solution, (which causes a reddish ferruginous precipitate,) until upon removing, filtering, and testing a small sample of this solution with potassium ferrocyanide, it shows itself substantially free from iron in the ferric form; and then by filtration, or otherwise, I remove the said iron precipitate. The alkali-carbonate solution is now added to the fluo-sulphate solution until it ceases to bring down a further quantity of a white precipitate, and this white precipitate I prefer to remove at once from said solution by filtration or otherwise. This white precipitate is rich in aluminum and free from such iron as may have been present in a crude aluminum sulphate, if such has been used. This product is of particular value as a source of aluminum to be extracted by electrolysis or otherwise, and its physical qualities render it useful for other purposes.

I claim—

1. The process herein described of making an insoluble aluminum compound, which consists in combining aluminum sulphate and calcium fluoride to form an aluminum fluo-sulphate solution, and adding thereto an alkali carbonate.

2. The process herein described of removing the iron and making an insoluble aluminum compound, from an aluminum fluo-sulphate solution, which consists in first treating said solution with an alkali-carbonate to precipitate the iron, removing said iron and then treating said solution with a further quantity of said alkali-carbonate to cause precipitation of said aluminum compound.

WILLARD E. CASE.

Witnesses:
 JOHN M. BRAINARD,
 FRANKLIN P. TABER.